(12) United States Patent
Hinsenkamp et al.

(10) Patent No.: US 8,101,321 B2
(45) Date of Patent: Jan. 24, 2012

(54) FUEL CELL SYSTEM HAVING A FUEL CELL, A HYDROGEN STORAGE TANK, AND AN ANODE CIRCUIT

(75) Inventors: Gert Hinsenkamp, Kirchheim (DE); Manfred Stute, Esslingen (DE); Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 1182 days.

(21) Appl. No.: 11/698,183

(22) Filed: Jan. 25, 2007

(65) Prior Publication Data
US 2007/0190389 A1    Aug. 16, 2007

(30) Foreign Application Priority Data
Jan. 25, 2006 (DE) .................... 10 2006 003 799

(51) Int. Cl.
*H01M 8/04* (2006.01)
(52) U.S. Cl. ........................ 429/512; 429/502
(58) Field of Classification Search .................... 429/400
See application file for complete search history.

(56) References Cited

U.S. PATENT DOCUMENTS

| | | | |
|---|---|---|---|
| 3,586,435 A * | 6/1971 | Del Carlo et al. | 384/100 |
| 4,004,947 A * | 1/1977 | Bloomfield | 429/423 |
| 4,342,200 A * | 8/1982 | Lowi, Jr. | 62/191 |
| 5,532,573 A * | 7/1996 | Brown et al. | 322/22 |
| 5,967,164 A * | 10/1999 | Denda et al. | 137/1 |
| 7,322,793 B2 * | 1/2008 | Baumann et al. | 415/202 |
| 2003/0113602 A1 | 6/2003 | Nau et al. | 429/25 |
| 2003/0148167 A1 * | 8/2003 | Sugawara et al. | 429/34 |
| 2004/0216458 A1 * | 11/2004 | Spooner | 60/608 |
| 2005/0285407 A1 * | 12/2005 | Davis et al. | 290/54 |

FOREIGN PATENT DOCUMENTS

| | | |
|---|---|---|
| DE | 36 04 618 | 8/1987 |
| DE | 101 54 637 | 5/2003 |
| DE | 2020050017574 | * 12/2005 |
| DE | 20 2005 017 574 | 2/2006 |

* cited by examiner

*Primary Examiner* — Ula C Ruddock
*Assistant Examiner* — Jacob Marks
(74) *Attorney, Agent, or Firm* — Davidson, Davidson & Kappel, LLC

(57) ABSTRACT

A fuel cell system has at least one fuel cell, a hydrogen storage tank in which hydrogen is stored at a pressure above atmospheric and which communicates via a hydrogen supply line with an anode chamber of the fuel cell. An anode circuit, via which unreacted hydrogen is able to be recirculated from a region downstream of the anode chamber into the hydrogen supply line, is provided. At least one pumping device is provided between the outlet of the anode chamber and its inlet in the anode circuit and/or the hydrogen supply line. Between the hydrogen storage tank and the anode chamber, a turbine is provided, which supplies at least a portion of the power required for driving the pumping device.

9 Claims, 3 Drawing Sheets

FUEL CELL SYSTEM HAVING A FUEL CELL, A HYDROGEN STORAGE TANK, AND AN ANODE CIRCUIT

Priority is claimed to German Patent Application No. DE 10 2006 003 799.5, filed Jan. 25, 2006, the entire disclosure of which is hereby incorporated by reference herein.

BACKGROUND

The present invention relates to a fuel cell system having at least one fuel cell, a hydrogen storage tank, as well as an anode circuit.

From the German Patent Application DE 101 54637 A1, it is known to utilize the pressure energy contained in a hydrogen storage tank of a fuel cell system by employing a turbine to compress air that is directed to the cathode of the fuel cell. In this context, due to the low mass flow rate of hydrogen, the available pressure energy from the hydrogen storage tank does not suffice for delivering all of the cathode air.

A comparable approach for fuel cells having aqueous electrolyte is described by German Patent Application DE 36 04 618 A1. It likewise provides for utilizing pressure energy from the hydrogen tank to circulate the electrolyte.

Common to both DE 101 54637 A1 and DE 36 04 618 A1 is also the disadvantage that very complex sealing technology is required for the coupling of air/electrolyte and hydrogen via the turbine, in order to prevent hydrogen from passing over into the air/the electrolyte. These seals then lead, in turn, to increased friction and thus to a poor efficiency of the turbine.

SUMMARY OF THE INVENTION

It is an object of the present invention to avoid the aforementioned disadvantages and to devise a method for efficiently utilizing the pressure energy from a hydrogen tank.

By employing a turbine (tank pressure charger) to utilize the pressure energy from the tank in order to maintain the volumetric flow rate in the anode circuit, an advantage is attained that all parts of the turbine and of the pumping device (for example, a fluid-flow machine coupled to the turbine) come exclusively in contact with hydrogen or hydrogen-containing anode waste gas. As a result, a comparatively simple sealing of the entire unit to the outside suffices. The need is eliminated for the extremely complex sealing of the high-speed shaft, which typically connects the turbine and the pumping device, in the region of the bearings thereof.

Another advantage of the present invention is derived in that the tank pressure charger always supplies a substantial amount of energy when a substantial amount of hydrogen is required. Generally, this condition coincides with a likewise greater volumetric flow rate of recirculated anode waste gas. It is thus inherent to the system that the use of the pressure energy from the tank is optimized in terms of the anode recirculation requirement.

One very advantageous refinement of the present invention provides for the bearings of the turbine and especially for the bearings of the tank pressure charger as well, in the case of a turbine and pumping device mounted on one shaft, to be designed as gas bearings.

Another refinement provides for these gas bearings to be designed as hydrogen bearings. Thus, the sealing problem is completely circumvented since only hydrogen atmosphere or hydrogen-containing atmosphere prevails in the entire area of the turbine or of the tank pressure charger. The required bearing pressure may be easily supplied by feeding pressurized hydrogen from the tank, without entailing any additional expenditure of energy.

One particularly beneficial embodiment of the present invention provides for the tank pressure charger to be integrated in the hydrogen storage tank, respectively in the housing thereof. This further alleviates the aforementioned sealing problem.

A simple, and thus rugged, compact and energy efficient design may be implemented. It is, therefore, especially suited for use in land vehicles, watercraft or aircraft, since, compared to stationary applications, these vehicles place high demands on energy efficiency, structural compactness, weight and ruggedness.

BRIEF DESCRIPTION OF THE DRAWINGS

Other advantageous embodiments of the present invention are derived from the exemplary embodiment which is described below with reference to the drawing.

DETAILED DESCRIPTION

Figure 1:
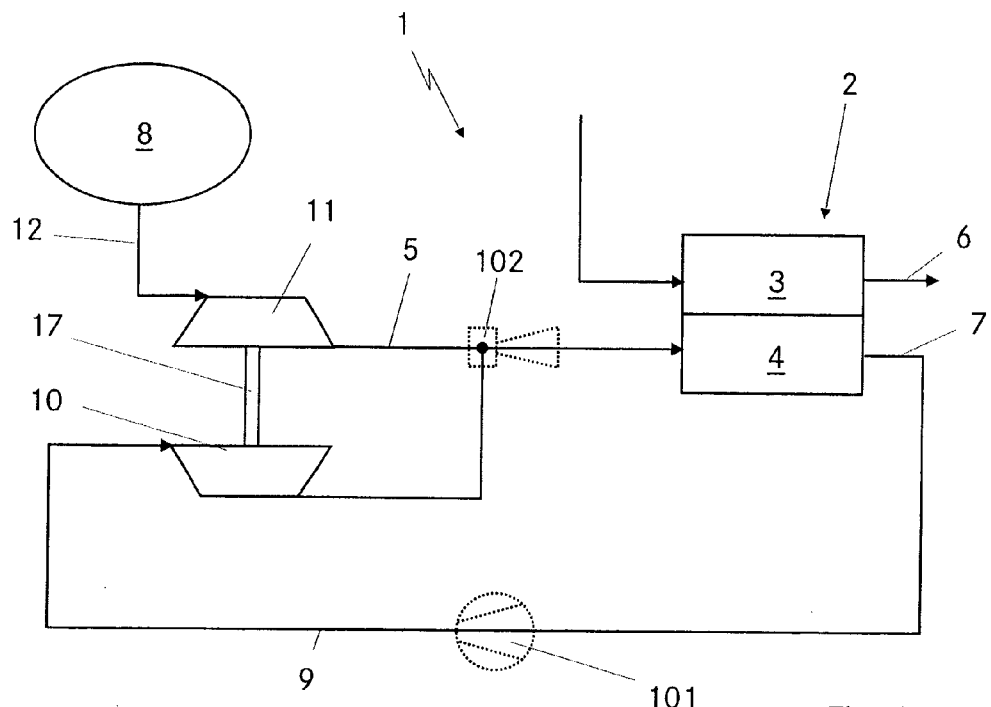
FIG. 1 a schematic representation of an exemplary fuel cell system according to the present invention.

A fuel cell system 1 is shown exemplarily in FIG. 1. Fuel cell unit 2 contained therein includes a plurality of fuel cells which are preferably configured in a stack, and in which case one or more fuel cell stacks may be electrically connected in series and/or in parallel, in order to supply a desired voltage and current level for electrical consumers. Fuel cell unit 2 is illustrated in a simplified representation by a cathode 3 and an anode 4. Cathode 3 is supplied in a manner known per se via a cathode-side supply line with an oxidizing agent, for example air, while anode 4 is supplied via an anode-side supply line 5 with a reducing agent, typically hydrogen. The reducing agents and oxidizing agents react with one another in the fuel cells of fuel cell unit 2, and reaction products are purged via cathode-side and anode-side purging lines 6, 7. The reaction, i.e. conversion, produces an electrical voltage in fuel cell unit 2 that may be used to supply electrical consumers, in particular an electric propulsion system.

The hydrogen, as reducing agent, is stored in a storage vessel or tank 8 at a pressure above atmospheric and supplied, as needed, via anode-side supply line 5 to anode 4 of fuel cell unit 2. At present, typical storage pressures for the hydrogen in tank 8 are approximately 20 to 750 bar above atmospheric, depending on the design of tank 8 and the amount of hydrogen actively contained therein at any one time. Without departing from the scope of the present invention, storage at lower or higher pressures is perfectly conceivable as well.

Other details known per se pertaining to fuel cell system 1 may likewise be implemented. However, they have only a subordinate role for the present invention, so that there is no need to discuss them in greater detail.

The hydrogen supplied to anode 4 is typically only partially converted therein. In a manner that is especially beneficial for the operation, only approximately 70 to 95%, preferably 80 to 90%, of the hydrogen provided is converted. The excess hydrogen arrives in the anode-side purging line 7 as anode waste gas and, from there, continues through a recirculation line 9 to return to the area of anode-side supply line 5. Together, lines 7, 9 used for recirculating the anode waste gas (anode recirculation) and, in part, line 5, are also referred to as anode circuit or (anode) loop.

To compensate for the pressure losses occurring in anode 4 and lines 7, 9 and, in part, 5, of the anode circuit, at least one pumping device may be provided in the anode circuit. Pumping devices of this kind are jet pumps 102 and/or electrical blowers 101, as described, for example, in U.S. Patent Application 2003/0148167. One or both of these pumping devices 101, 102 may be optionally provided here as well, as indicated in FIG. 1.

Alternatively or additionally thereto, a pumping device 10 may be provided here which is capable of being driven by a turbine 11. Turbine 11, which ideally supplies all—however, at least a portion—of the energy required for driving pumping device 10, is driven, in turn, by the pressure energy contained in the hydrogen flowing out of tank 8. Since the pressure level of the hydrogen must be reduced as compared to its pressure level in tank 8 before it flows into anode 4, this energy is available anyway.

Figure 2:
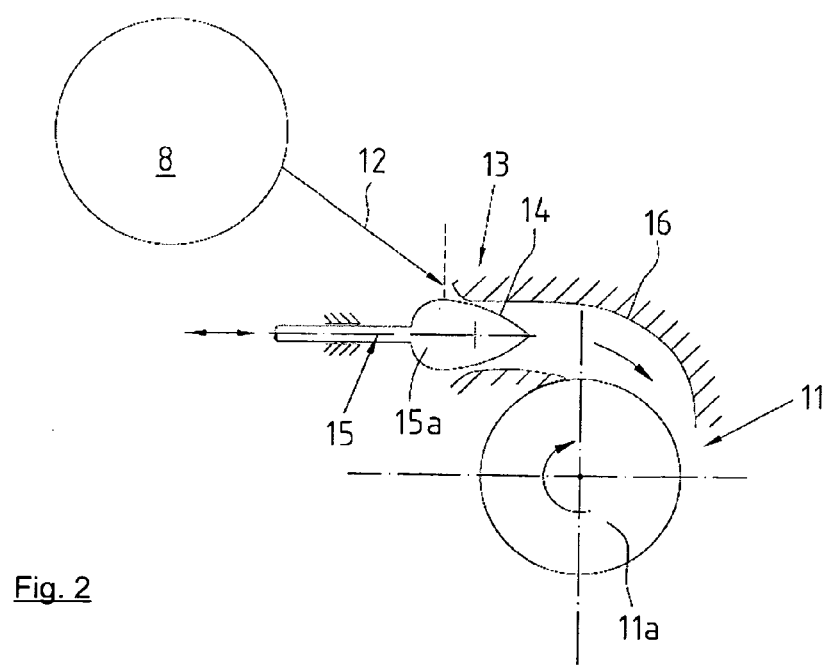
FIG. 2 a representation of an exemplary metering valve.

FIG. 2 shows a block diagram of the essential components used in generating the required energy from the tank pressure by way of turbine 11. The hydrogen flows out of hydrogen pressure tank 8 via a conduit element 12 to a metering valve 13. Depending on the existing fill level of tank 8, typical pressures on the order of between maximally 750 bar and minimally 20 bar prevail. Located in the region of metering valve 13 is a Laval nozzle 14, which may be variably adjustable in cross section by an axially movable slide valve 15. This slide valve 15 may be used to adjust the Laval nozzle from a minimum zero cross section to a maximum cross section. In this context, in the specific embodiment shown in FIG. 2, a valve body 15a of slide valve 15 represents the symmetrical inner wall of the Laval nozzle. In response to a typically very large pressure differential, a very rapid flow of the hydrogen to be released occurs in Laval nozzle 14 at a rate that is generally in the supersonic range. Passing through a turbine housing 16, this flow is directed to actual turbine wheel 11a of turbine 11. It impinges thereon essentially in its circumferential direction, producing in a manner known per se a momentum exchange between the rapidly flowing hydrogen and turbine wheel 11a. This sets turbine wheel 11a in motion, so that the actual conversion of the kinetic energy of the hydrogen into useful energy takes place at turbine wheel 11a. Turbine wheel 11a is typically designed as a pure impulse-turbine wheel, for example along the lines of a Pelton wheel. Due to the centrifugal force field, over the large operating range of the turbine, a higher pressure prevails at the turbine inlet in response to the speed differential, i.e., the circumferential speed differential from the inlet to the outlet. Since, however, in response to the pressure decrease in Laval nozzle 14, virtually the entire pressure of tank 8 is reduced in order to meter the hydrogen, this pressure differential from the turbine wheel inlet to the turbine wheel outlet is generally of little consequence. Thus, when it comes to radial turbines of this special design, one may also speak of a quasi constant-pressure turbine or of an impulse turbine.

For such turbines 11, the running ratio, thus the ratio of the circumferential speed of the wheel in the inlet region and the exiting velocity of the hydrogen, is set to a value well below 0.2.

Due to the high inlet pressures prevailing in turbine 11 and the relatively low volumetric flow rates, in most cases one single Laval nozzle 14 suffices, as shown in the representation in FIG. 2. However, from a standpoint of mechanical engineering, in consideration of the bearing load and to improve the partial-load ratios, a plurality of Laval nozzles may also be used. In place of one or a plurality of Laval nozzles, other supplementary built-on components for influencing the volumetric flow rate, such as adjustable annular diaphragms, slide valves or the like, are also conceivable.

Figure 3:
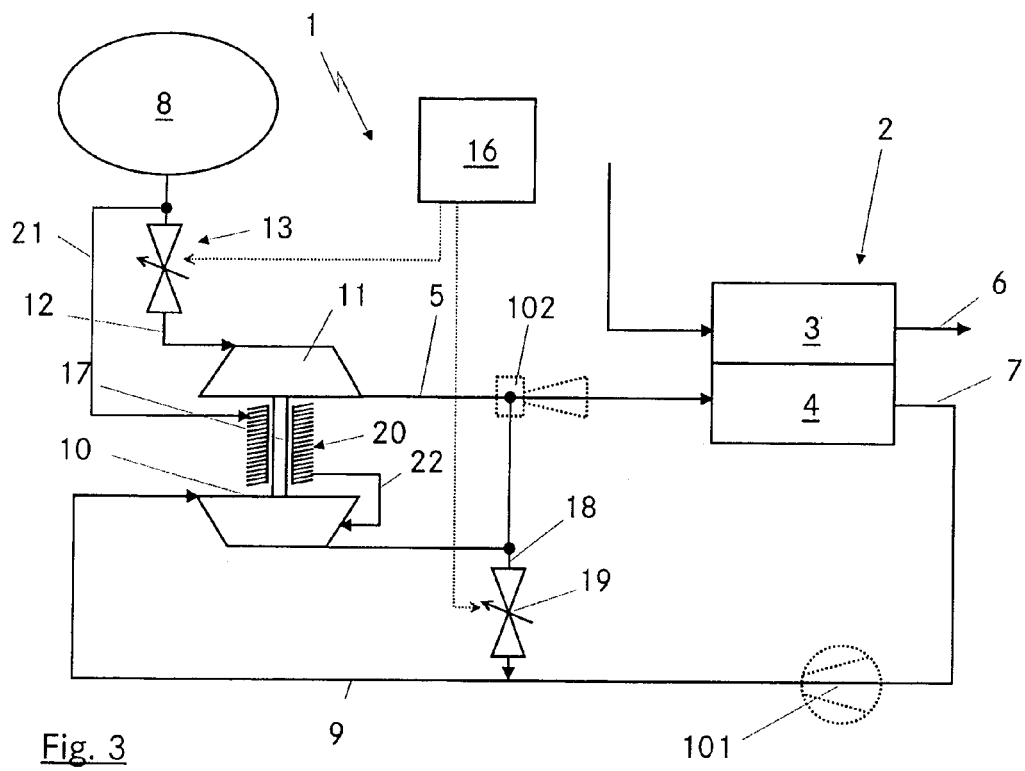
FIG. 3 a schematic representation of a first specific embodiment of the fuel cell system according to the present invention.

A comparatively more detailed design embodiment of such a tank pressure charger including pumping device 10 and turbine 11 is shown in FIG. 3. Analogously to the design shown in FIG. 1, the tank pressure charger, respectively pumping device 10, is configured here as well in the region of the anode recirculation. In this design, the amount of hydrogen supplied to fuel cell 2 from tank 8 is regulated or metered solely by slide valve 15 in metering valve 13. In this regard, a control, indicated exemplarily by reference numeral 16, undertakes the metering process utilizing known and customary input values, such as the power requirements placed on the fuel cell.

Figure 4:
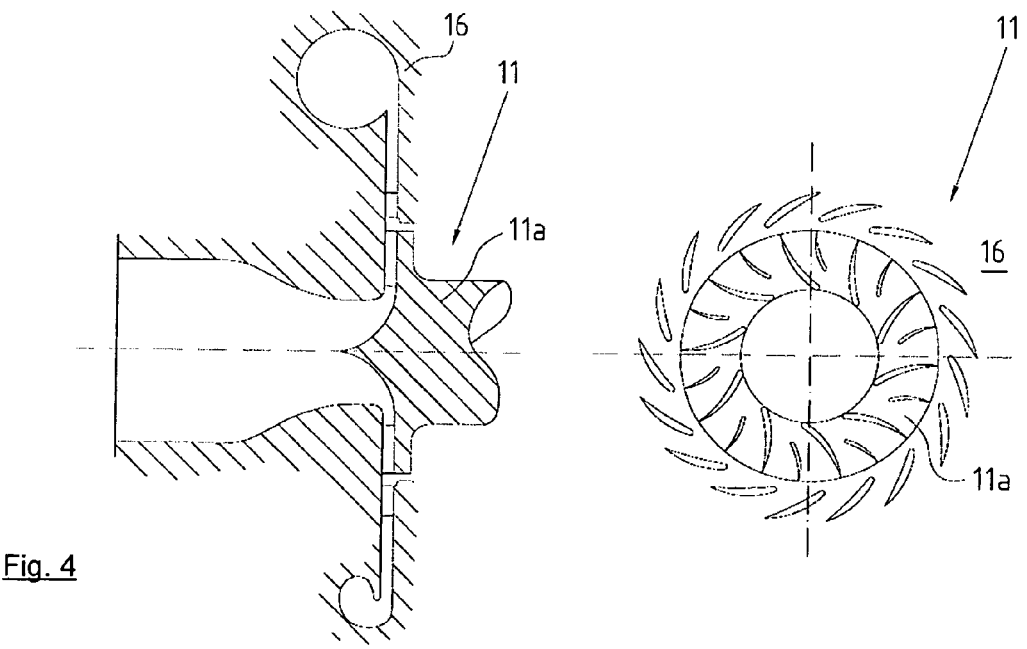
FIG. 4 a representation of a compressor impeller (radial-flow turbine)

Pumping device 10 is likewise designed here as a fluid-flow machine, analogously to turbine 11. This design permits a very simple, rugged and efficient operation, as is known analogously for exhaust-gas turbochargers. The configuration in FIG. 3 shows that, here, pumping device 10 is directly coupled via a shaft 17 to turbine 11. A very simple and efficient design of pumping device 10 is attainable, for example, by employing a design that incorporates a so-called 2D compressor impeller, which, moreover, is very cost-effective to manufacture. A 2D compressor impeller (radial turbine) of this kind is shown exemplarily in the FIG. 4. The 2D impeller type may also be implemented similarly on the turbine side.

To regulate the pressure of the gases being recirculated via the anode recirculation or to adapt the gas flow through the pumping device, as shown in the illustrated design embodiment, a bypass recirculation line 18 extending around pumping device 10 is used, which is adjustable in cross section by a bypass blowoff valve 19, which may likewise be driven correspondingly by control device 16. Consequently, both the speed of pumping device 10, as well as its performance may be influenced. The portion of the recirculation quantity blown off via bypass recirculation line 18, given an open bypass blowoff valve 19, then flows back via bypass recirculation line 18 into recirculation line 9 and thus into the region of the inlet of pumping device 10.

Consideration should also be given to the bearing arrangement used for turbine 11 and pumping device 10. Out of a multiplicity of conceivable bearing types, in particular slide bearings, for example, a design incorporating gas bearings is very advantageous for bearing assembly 20. Such a gas bearing may be operated, for example, using air, nitrogen or the like. In this context, the gas forms a cushion of gas or pressure between the bearing elements, permitting nearly frictionless motion of the same thereon. Due to the previously discussed sealing problem typically encountered in hydrogen-containing circuits, it is especially beneficial to use hydrogen bearings for the design depicted here. To this end, hydrogen from tank 8 may be used via line 21 shown here exemplarily in order to achieve the load-carrying capacity of the bearing using the pressure provided by the tank pressure or a pressure possibly also reduced in valve device 13. The volumetric flow introduced via line 21 into bearing region 20 is then able to be fed to pumping device 10, as indicated exemplarily by line 22. When hydrogen bearings are used, the hydrogen may then be supplied to the fuel cell once again via the recirculation circuit.

As already indicated, bearing assemblies which employ nitrogen and air may also conceivably be used. However, because of the leakage typically encountered when such high-speed shafts are used, these assemblies would tend to lead to an increase in the nitrogen or air concentration in the anode circuit necessitating frequent purging of these unwanted substances.

Figure 5:
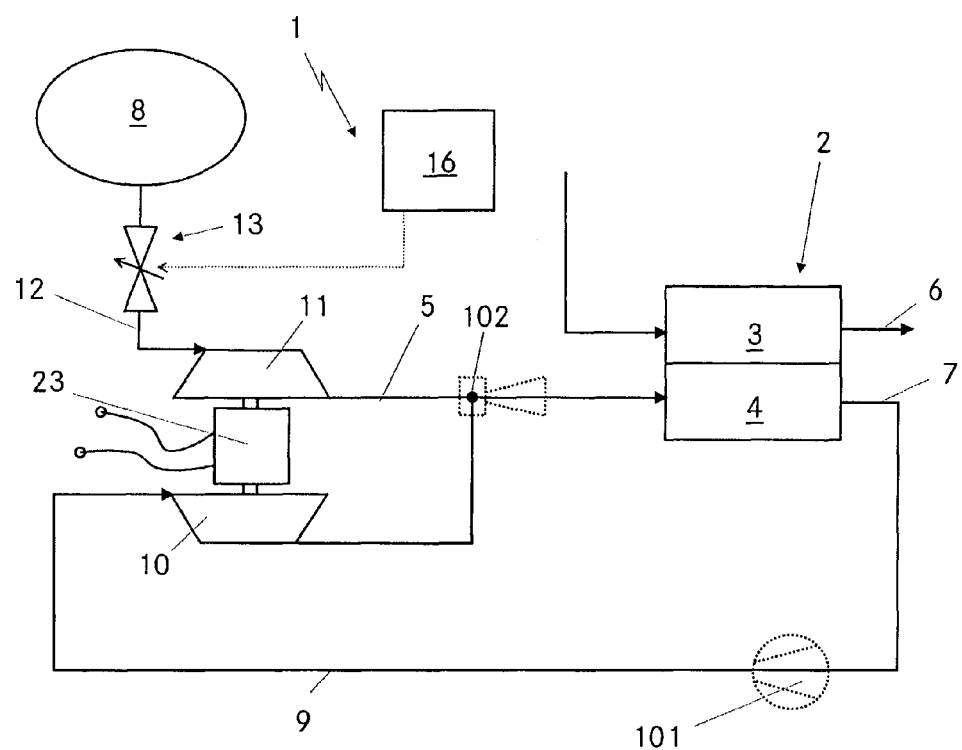
FIG. 5 a schematic representation of another specific embodiment of the fuel cell system according to the present invention.
Figure 6:
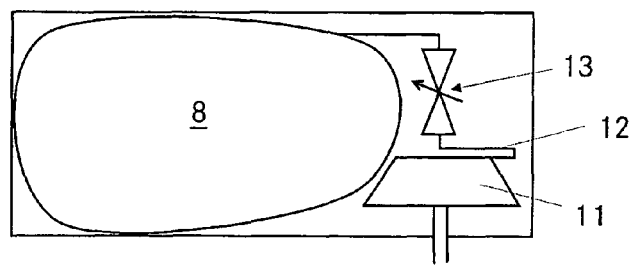
FIG. 6 a schematic representation of a combination of a turbine and a hydrogen storage tank.

Another design embodiment of the present invention is shown in FIG. 5, which, in principle, is to be understood analogously previously described design embodiments, even if all of the components have not been identically indicated. In place of bearing assembly 20, a naturally likewise bearing-supported electromotor 23 may be found, which may be motor-driven, if required, to assist pumping device 10. When there is no need for a proportionately high volumetric flow rate in pumping device 10, electric machine 23 may also be operated regeneratively in order to obtain additional potential energy from the pressure of the hydrogen flowing from tank 8 to anode 4 that is converted via turbine 11 into kinetic energy. Thus, by properly drawing current from regeneratively operated electric machine 23, it is possible to reduce the speed of the system and thus the volumetric flow to a desired level.

In this context, the design whereby electric machine 23 is configured between turbine 11 and pumping device 10 is selected purely exemplarily; alternatively, it could also be situated laterally next to turbine 11 or next to pumping device 10, for example.

Finally, further details are given below regarding the two optional pumping devices 101 and 102 shown in FIG. 1. These may be additionally provided in the anode circuit in order to assist pumping device 10. This may be useful, in particular, under various load conditions, since it makes it possible for the recirculated quantities and the pressures developing in the recirculated quantities to be variably adapted in a very simple manner over broad ranges. In this context, using the pressure energy still available downstream of turbine 11, gas-jet pump 102 would additionally draw in the gas volume coming from pumping device 10 and thereby assist the same. This may be expedient in certain load ranges, so that even a gas-jet pump 102 of this kind provides useful power assistance.

Primarily, however, an electrical blower, i.e., pump 101, should be considered as providing useful power assistance. Driven by an electromotor, an electric blower, such as pump 101, may be able to ensure recirculation, independently of the energy supplied by turbine 11. Thus, a very effective load adaptation may be readily provided over a very broad load range, permitting recirculation of an appropriate quantity of anode waste gas, even when this is not possible using the supplied quantity of hydrogen, such as when fuel-cell device 1 is switched off.

In this context, to ensure a proper seal tightness, blower 101 is expediently designed in such a way that the delivery section is completely separated from the electromotive section. This may be accomplished, for example, by employing a magnetic coupling or a split-cage motor, as described exemplarily in the German Utility Model Patent DE 20 2005 017 574.

What is claimed is:

1. A fuel cell system comprising:
at least one fuel cell having an anode chamber having an outlet and an inlet;
a hydrogen storage tank storing hydrogen at a pressure above atmospheric and communicating via a hydrogen supply line with the anode chamber;
an anode circuit, unconverted hydrogen capable of being recirculated from a region downstream of the anode chamber into the hydrogen supply line via the anode circuit;
at least one pumping device being provided in the hydrogen supply line and/or in the anode circuit between the outlet and the inlet of the anode chamber; and
a turbine between the hydrogen storage tank and the anode chamber, the turbine supplying at least a portion of the power required for driving the pumping device;
wherein at least the turbine is bearing-supported by hydrogen bearings supplied with hydrogen by the hydrogen storage tank.

2. The fuel cell system as recited in claim 1 wherein the pumping device is designed as a fluid-flow machine.

3. The fuel cell system as recited in claim 1 wherein at least one Laval nozzle is located between the hydrogen storage tank and the turbine, the Laval nozzle being adjustable in cross section by a movable slide valve.

4. The fuel cell system as recited in claim 1 wherein the turbine and the pumping device are mounted on a common shaft.

5. The fuel cell system as recited in claim 1 wherein the anode circuit includes a purging line at the outlet of the anode chamber and a recirculation line extending from the purging line to an input of the pumping device,
the fuel cell system further comprising an outline line extending from an outlet of the pumping device; and
a bypass recirculation line coupling the outlet line to the recirculation line, the bypass recirculation line having an adjustable opening cross section branches off, through which delivered gas is able to be recirculated, as needed, from the outlet line to the recirculation line.

6. The fuel cell system as recited in claim 1 further comprising, in addition to the pumping device, a gas-jet pump at a junction of the hydrogen supply line and of a recirculation line.

7. The fuel cell system as recited in claim 1 wherein the turbine and the pumping device, together with the hydrogen storage tank, form a structurally integrated unit.

8. The fuel cell system as recited in claim 1 further comprising, in addition to the pumping device, another pumping device capable of being driven electromotively.

9. The fuel cell system as recited in claim 1 further comprising a line feeding the hydrogen from the hydrogen bearings into the at least one pumping device.

* * * * *